United States Patent
Jiang

(10) Patent No.: US 9,674,206 B2
(45) Date of Patent: Jun. 6, 2017

(54) METHOD, DEVICE AND SYSTEM FOR ALERTING AGAINST UNKNOWN MALICIOUS CODES

(75) Inventor: Wu Jiang, Beijing (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 48 days.

(21) Appl. No.: 13/481,273

(22) Filed: May 25, 2012

(65) Prior Publication Data

US 2012/0233691 A1    Sep. 13, 2012

Related U.S. Application Data

(63) Continuation of application No. PCT/CN2010/078951, filed on Nov. 22, 2010.

(30) Foreign Application Priority Data

Nov. 26, 2009 (CN) .......................... 2009 1 0247172

(51) Int. Cl.
*H04L 29/06* (2006.01)

(52) U.S. Cl.
CPC .... *H04L 63/1416* (2013.01); *H04L 2463/146* (2013.01)

(58) Field of Classification Search
CPC ........... H04L 63/1416; H04L 2463/146; H04L 63/145; H04L 63/1425; H04L 63/1408; H04L 47/2441
USPC ........................................................ 726/22
See application file for complete search history.

(56) References Cited

U.S. PATENT DOCUMENTS

| | | | |
|---|---|---|---|
| 7,007,302 B1* | 2/2006 | Jagger et al. | 726/25 |
| 8,201,247 B1* | 6/2012 | Chen et al. | 726/22 |
| 2003/0009699 A1* | 1/2003 | Gupta et al. | 713/201 |
| 2004/0148281 A1* | 7/2004 | Bates et al. | 707/3 |
| 2008/0313738 A1* | 12/2008 | Enderby | 726/24 |

FOREIGN PATENT DOCUMENTS

| | | |
|---|---|---|
| CN | 1997017 A | 7/2007 |
| CN | 101242416 A | 8/2008 |
| CN | 101286850 A | 10/2008 |

(Continued)

OTHER PUBLICATIONS

1st Office Action in corresponding Chinese Patent Application No. 200910247172.8 (Apr. 14, 2011).

(Continued)

*Primary Examiner* — Yogesh Paliwal
(74) *Attorney, Agent, or Firm* — Leydig, Voit & Mayer, Ltd.

(57) ABSTRACT

A method, a device, and a system for alerting against unknown malicious codes are disclosed. The method includes: detecting characteristics of a packet; judging whether any suspicious code exists in the packet according to a result of the detection; recording a source address of the suspicious code if the suspicious code exists in the packet; and sending alert information that carries the source address to a monitoring device. The embodiments of the present invention can report source addresses of numerous suspicious codes proactively at the earliest possible time, lay a foundation for shortening the time required for overcoming virus threats, and avoid the trouble of installing software on the client.

7 Claims, 3 Drawing Sheets

(56) References Cited

FOREIGN PATENT DOCUMENTS

| CN | 101587521 A | 11/2009 |
|---|---|---|
| CN | 101714931 A | 5/2010 |
| KR | 20090078691 A | 7/2009 |

OTHER PUBLICATIONS

International Search Report in corresponding International Patent Application No. PCT/CN2010/078951 (Mar. 3, 2011).
Written Opinion of the International Searching Authority in corresponding International Patent Application No. PCT/CN2010/078951 (Mar. 3, 2011).

* cited by examiner

METHOD, DEVICE AND SYSTEM FOR ALERTING AGAINST UNKNOWN MALICIOUS CODES

CROSS-REFERENCE TO RELATED APPLICATION

This application is a continuation of International Application No. PCT/CN2010/078951, filed on Nov. 22, 2010, which claims priority to Chinese Patent Application No. 200910247172.8, filed on Nov. 26, 2009, which is hereby incorporated by reference in its entirety.

FIELD OF THE INVENTION

The present invention relates to network security technologies, and in particular, to a method, a device, and a system for alerting against unknown malicious codes.

BACKGROUND OF THE INVENTION

With popularization of the Internet, higher network security is required. Loopholes are frequently used for launching attacks. The time from discovery to use of a security loophole is now shortened from a few months to a few days. Once a loophole is discovered, it is used for launching attacks shortly. For such attacks, it usually takes a long time for the vendor to obtain a sample of malicious codes, and it is slower to release the corresponding patches. Therefore, such attacks tend to cause huge damages. MS Blast was used for launching attacks hardly in less than 25 days after it was discovered, and Nachi (a variant of MS Blast) was used for launching attacks in less than one week after it was discovered. If the malicious codes are discovered early, the attacks can be prevented in time, and the loss caused by malicious codes will be reduced.

In the prior art, network devices are unable to report suspicious codes. After the malicious code attack is launched, it takes a long time for the vendor to obtain the malicious code sample. Antivirus software analyzes files downloaded to the computer and reports the analysis result to the monitoring center. However, the computer may still be attacked by downloaded malicious codes if the downloaded data is not treated properly, which brings a heavy burden onto the computer. Antivirus software has to be installed on the computer, which is troublesome to the user. For such reasons, some users refuse to install antivirus software on network devices so that such devices are more vulnerable to propagation of malicious codes.

SUMMARY OF THE INVENTION

An embodiment of the present invention provides a method, a device, and a system for alerting against unknown malicious codes, so as to report source addresses of numerous suspicious codes proactively at the earliest possible time, lay a foundation for shortening the time required for overcoming virus threats, and avoid the trouble of installing software on the client.

An embodiment of the present invention provides a method for alerting against unknown malicious codes, including:
  detecting characteristics of a packet;
  judging whether any suspicious code exists in the packet according to a result of the detection;
  recording a source address of the suspicious code if the suspicious code exists in the packet; and
  sending alert information that carries the source address to a monitoring device.

An embodiment of the present invention provides a network device, including:
  a first detecting module, configured to detect characteristics of a packet;
  a first judging module, configured to judge whether any suspicious code exists in the packet according to a result of the detection performed by the first detecting module;
  a first recording module, configured to record a source address of the suspicious code if the first judging module determines that the suspicious code exists in the packet; and
  a first sending module, configured to send alert information that carries the source address to a monitoring device.

An embodiment of the present invention provides a system for alerting against unknown malicious codes. The system includes a network device and a monitoring device. The monitoring device is configured to: receive alert information; resolve the alert information to obtain a source address; download a suspicious code corresponding to the source address; and judge whether the suspicious code is malicious; and send alarm information when determining the suspicious code as malicious.

Therefore, the method, the device, and the system for alerting against unknown malicious codes in the embodiments of the present invention report source addresses of numerous suspicious codes proactively at the earliest possible time, enable the vendor to obtain the source addresses of malicious code samples shortly after the malicious codes occur, ensure comprehensiveness of the alert information source, lay a foundation for shortening the time required for overcoming virus threats, and avoid the trouble of installing software on the client.

BRIEF DESCRIPTION OF THE DRAWINGS

To make the technical solution under the present invention or in the prior art clearer, the following outlines the accompanying drawings involved in the description of the embodiments of the present invention or the prior art. Apparently, the accompanying drawings outlined below are illustrative rather than exhaustive, and persons of ordinary skill in the art can derive other drawings from them without any creative effort.

DETAILED DESCRIPTION OF THE EMBODIMENTS

The following detailed description is given in conjunction with the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments given herein without any creative effort, shall fall within the protection scope of the present invention.

The following describes the technical solution of the present invention in detail.

Figure 1:
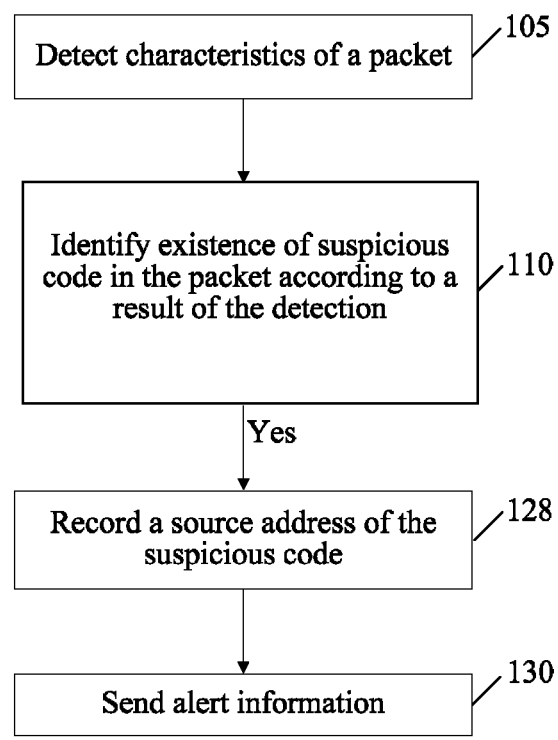
FIG. 1 is a schematic diagram of a method for alerting against unknown malicious codes according to an embodiment of the present invention.

FIG. 1 is a schematic diagram of a method for alerting against unknown malicious codes according to an embodiment of the present invention. The method in this embodiment includes the following steps:

Step 105: Detect characteristics of a packet.

Step 110: Judge whether any suspicious code exists in the packet according to a result of the detection.

Step 128: Record a source address of the suspicious code if the suspicious code exists in the packet.

Step 130: Send alert information that carries the source address to a monitoring device.

The entity for performing the steps of this embodiment is a network device. The source address of the suspicious code in the packet is sent to the monitoring device so that the monitoring device is alerted for suspicious codes in time.

In this embodiment, the characteristics of the packet are detected. For example, the detection method is to detect whether the name of the suspicious code is included in the packet, whether the file header of the suspicious code is included in the data stream, or both.

Specifically, at the time of detecting whether the name of the suspicious code is included in the packet, if a string like get *.exe is detected in the packet, it indicates that an executable file is being transmitted, in which *.exe is a suspicious code, and * represents a string of a random length. The executable file may leak information of the terminal user, damage the terminal system, or even let the terminal be controlled by the attacker. Or, if a packet includes strings like get *.dll or get *.ocx, it indicates that an executable file or a string of malicious codes is being transmitted, which may leak information of the terminal user, damage the terminal system, or even let the terminal be controlled by the attacker. Such codes need to be reported.

At the time of detecting whether the file header of the suspicious code is included in the data stream, if a PE (portable executable) file header characteristic code "MZ" is detected (MZ is expressed by American Standard Code for Information Interchange (ASCII) codes), the PE file may leak information of the terminal user, damage the terminal system, or even let the terminal be controlled by the attacker when the PE file is executed. Therefore, the PE file is a string of suspicious codes.

When the two detection methods above are combined, if get *.jpg is detected and a PE file header characteristic code "MZ" is detected (MZ is expressed by ASCII codes) in the corresponding data, the PE file is a string of suspicious codes, because the user attempts to download a picture but an executable file is returned. The spoofing indicates that the PE file is probably is a string of malicious codes.

The source of the suspicious code needs to be located after the suspicious code is detected. Specifically, if the suspicious code is detected by checking whether the name of the suspicious code is included in the data stream, the source address generally appears in the URL after get. If the suspicious code is detected by checking whether the file header of the suspicious code is included in the data stream, the source address of the packet may be searched out according to the information in the packet. If both of the detection methods are applied in detecting the suspicious code, the source address generally appears in the URL after get.

After the source address of the suspicious code is recorded, alert information that carries the source address is sent to the monitoring device. After the alert information is sent, the network device receives alarm information returned by the monitoring device.

The method for alerting against unknown malicious codes in this embodiment reports source addresses of numerous suspicious codes proactively at the earliest possible time, enables the vendor to obtain the source addresses of malicious code samples shortly after the malicious codes occur, ensures comprehensiveness of the alert information source, lays a foundation for shortening the time required for overcoming virus threats, and avoids the trouble of installing software on the client.

Figure 2:
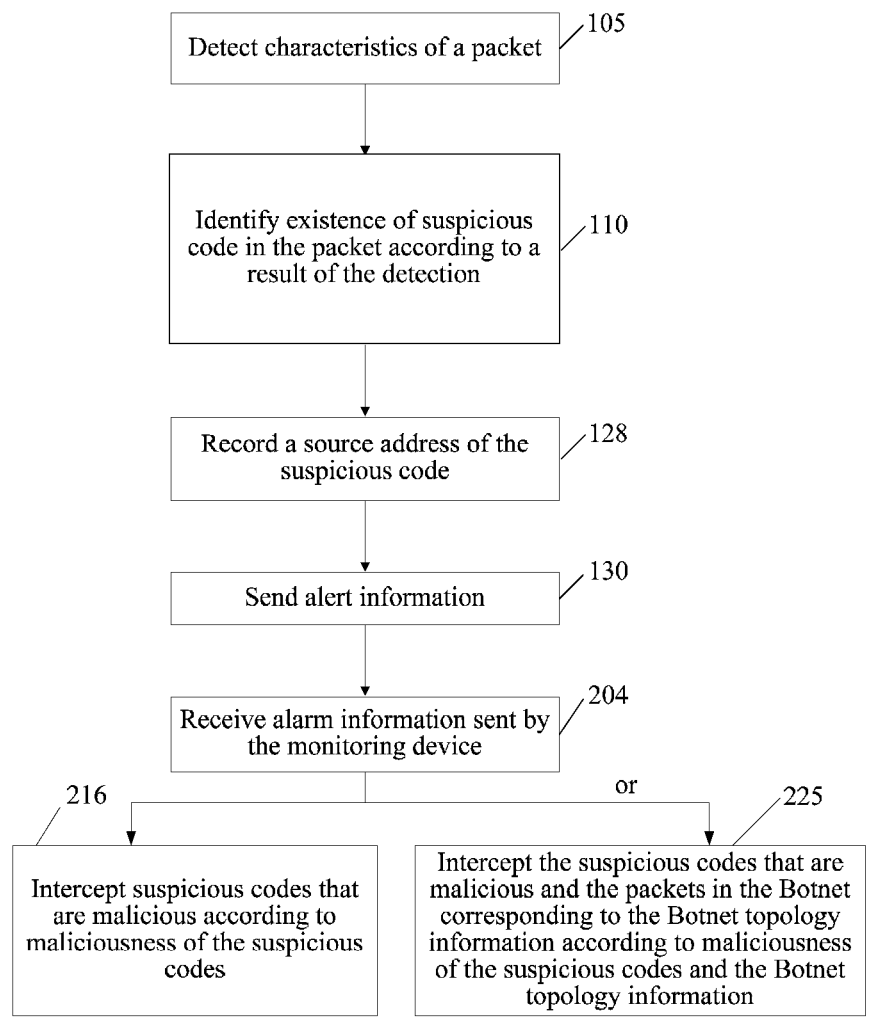
FIG. 2 is a schematic diagram of a method for alerting against unknown malicious codes according to an embodiment of the present invention.

FIG. 2 is a schematic diagram of a method for alerting against unknown malicious codes according to an embodiment of the present invention. The method in this embodiment includes the following steps:

Step 105: Detect characteristics of a packet.

Step 110: Judge whether any suspicious code exists in the packet according to a result of the detection.

Step 128: Record a source address of the suspicious code if the suspicious code exists in the packet.

Step 130: Send alert information that carries the source address to a monitoring device.

Step 204: Receive alarm information sent by the monitoring device. The alarm information includes maliciousness of the suspicious code, or includes both the maliciousness of the suspicious code and the Botnet topology information.

This embodiment differs from the previous embodiment in that: the network device receives alarm information returned by the monitoring device after sending alert information. The alarm information includes maliciousness of the suspicious code against which the alert is raised, or includes both the maliciousness of the suspicious code and the Botnet topology information.

The monitoring device may identify maliciousness of the suspicious code through characteristics detection, sandbox test, or both.

If the monitoring device uses characteristics detection to calculate possibility of maliciousness, the monitoring device compares the suspicious code with a more detailed repository of malicious code characteristics. If the suspicious code matches any characteristics in the repository of malicious code characteristics, the monitoring device can calculate the probability of attacks launched by the malicious code according to the matching extent, and identify possibility of such attacks, namely, maliciousness possibility. For example, if the suspicious code matches a string of suspicious code characteristics regarded as having an 80% probability of launching attacks in the characteristics repository, the suspicious code is also regarded as having an 80% probability of launching attacks. If this probability exceeds the alarm threshold, the suspicious code is possibly malicious.

If the monitoring device uses a sandbox to calculate the maliciousness possibility, the monitoring device runs the suspicious code in the sandbox automatically, records the execution result and the running status, and calculates the maliciousness possibility according to the record. The sandbox is a professional virtual environment. The program that runs in the sandbox is redirected into the sandbox when modifying a registry or a file. In this way, if the program is malicious, no impact is caused outside the sandbox. Even if an attack is launched in the sandbox, the attack impact is cancelled by restarting the sandbox. For example, the monitoring device detects that a malicious event is triggered in the process of running a suspicious code, and the probability of launching attacks from the event is 40%. Therefore, the maliciousness possibility of the suspicious code is 40%. If this probability exceeds the alarm threshold, the suspicious code is possibly malicious.

If the suspicious code is determined as malicious, the monitoring device may retrieve the Botnet topology information in the malicious code, and generates and sends alarm information that carries the Botnet topology information.

The Botnet topology information in the foregoing malicious code includes Bot hosts as well as the IP address, port, or URL that controls the hosts.

After the monitoring device sends the alarm information that carries the Botnet topology information, the network device receives the alarm information sent by the monitoring device. The alarm information includes maliciousness of the suspicious code, or includes both the maliciousness of the suspicious code and the Botnet topology information.

The method in this embodiment may further include the following steps:

Step 216: Intercept suspicious codes that are malicious according to maliciousness of the suspicious codes; or Step 225: Intercept the suspicious codes that are malicious and the packets in the Botnet corresponding to the Botnet topology information according to maliciousness of the suspicious codes and the Botnet topology information.

After receiving the alarm information, the network device intercepts the corresponding suspicious codes and the packets in the Botnet.

The method for alerting against unknown malicious codes in this embodiment reports source addresses of numerous suspicious codes proactively at the earliest possible time, ensures comprehensiveness of the alert information sources, lays a foundation for shortening the time required for overcoming virus threats, and avoids the trouble of installing software on the client. Moreover, because the network device sends the source address of the suspicious codes rather than the suspicious codes themselves, the occupancy of user bandwidth is reduced; the monitoring device analyzes the suspicious codes and sends alarms to the network device so that the network device can intercept malicious codes; the monitoring device retrieves the Botnet topology information and sends Botnet alarms to the network device, and therefore, the network device intercepts the packets in the Botnet, which reduces possibility of the host being attacked.

Figure 3:
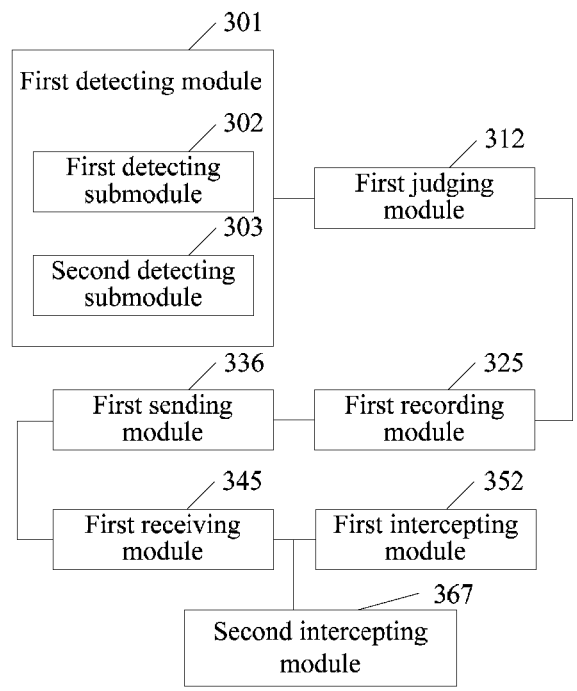
FIG. 3 is a schematic diagram of a network device according to an embodiment of the present invention.

FIG. 3 is a schematic diagram of a network device according to an embodiment of the present invention. The network device in this embodiment includes:

a first detecting module 301, configured to detect characteristics of a packet;

a first judging module 312, configured to judge whether any suspicious code exists in the packet according to a result of the detection performed by the first detecting module;

a first recording module 325, configured to record a source address of the suspicious code if the first judging module determines that the suspicious code exists in the packet; and a first sending module 336, configured to send alert information that carries the source address to a monitoring device.

In this embodiment, the first detecting module detects characteristics of the packet, for example, by detecting whether the name of the suspicious code is included in the packet, whether the file header of the suspicious code is included in the data stream, or both. The first judging module judges whether any suspicious code exists in the packet according to the result of the detection performed by the first detecting module. The first recording module records the source address of the suspicious code if the first judging module determines that the suspicious code exists in the packet, and the first sending module sends alert information to the monitoring device. After the alert information is sent, the network device receives alarm information returned by the monitoring device.

The first detecting module in this embodiment may further include:

a first detecting submodule 302, configured to detect whether the name of the suspicious code exists in the data stream; and/or a second detecting submodule 303, configured to detect whether the file header of the suspicious code exists in the data stream.

This embodiment may further include:

a first receiving module 345, configured to receive alarm information sent by the monitoring device, where the alarm information includes maliciousness of the suspicious code, or includes both the maliciousness of the suspicious code and the Botnet topology information.

This embodiment may further include:

a first intercepting module 352, configured to intercept suspicious codes that are malicious according to maliciousness of the suspicious codes; or a second intercepting module 367, configured to intercept the suspicious codes that are malicious and the packets in the Botnet corresponding to the Botnet topology information according to maliciousness of the suspicious codes and the Botnet topology information.

The network device provided in this embodiment reports source addresses of numerous suspicious codes proactively at the earliest possible time, ensures comprehensiveness of the alert information sources, lays a foundation for shortening the time required for overcoming virus threats, and avoids the trouble of installing software on the client. Moreover, the first receiving module receives the alarm information from the monitoring device, and therefore, the network device interrupts malicious codes and the packets in the Botnet, which reduces the possibility of the host being attacked.

Figure 4:
FIG. 4 is a schematic diagram of a system for alerting against unknown malicious codes according to an embodiment of the present invention.

FIG. 4 is a schematic diagram of a system for alerting against unknown malicious codes according to an embodiment of the present invention. The system in this embodiment includes the network device 401 and the monitoring device 412 shown in FIG. 4. The monitoring device is configured to: receive alert information; resolve the alert information to obtain a source address; download a suspicious code corresponding to the source address; and judge whether the suspicious code is malicious; and send alarm information when determining the suspicious code as malicious.

An embodiment of the present invention provides a system for alerting against unknown malicious codes. The system collects source addresses of numerous suspicious codes proactively at the earliest possible time, ensures comprehensiveness of the alert information sources, lays a foundation for shortening the time required for overcoming virus threats, and avoids the trouble of installing software on the client.

After reading the foregoing embodiments, those skilled in the art are clearly aware that the embodiments of the present invention may be implemented through hardware, or, preferably in most circumstances, through software in addition to a necessary universal hardware platform. Therefore, all or part of the novelty of the present invention may be embodied in a software product. The software product may be stored in storage media such as ROM/RAM, magnetic disk, or CD-ROM, and incorporates several instructions for instructing a computer device (such as personal computer, server, or network device) to execute the method specified in any embodiment of the present invention or a part of the embodiment.

Finally, it should be noted that the above embodiments are merely provided for describing the technical solutions of the present invention, but not intended to limit the present invention. It is apparent that persons skilled in the art can make various modifications and variations to the invention without departing from the spirit and scope of the invention. The present invention is intended to cover the modifications and variations provided that they fall in the scope of protection defined by the following claims or their equivalents.

What is claimed is:

1. A method for alerting against unknown malicious codes, comprising:
   determining, by a network device from characteristics of a packet of a data stream comprising a plurality of packets, a suspicious code exists in the data stream when:
      data carried in a packet of the plurality of packets comprises a 'get *' data string, wherein '*' comprises a string of random length including a name for a file,
      data carried in another packet of the plurality of packets comprises a characteristic code of a portable executable (PE) file header, and
      a file type of the file corresponding to the 'get *' data string differs from a file type of a PE file associated with the PE file header;
   recording, by the network device, a source address of the suspicious code when the network device determines, during the determining, that the suspicious code exists in the packet, wherein the source address appears in a URL after 'get' in the 'get *' data string and is used for downloading the suspicious code by a monitoring device; and
   sending, by the network device, first alert information that carries the source address to the monitoring device, and where the source address is thereafter used by the monitoring device to perform malicious code detection.

2. The method according to claim 1, further comprising:
   receiving, by the network device, a second alarm information sent by the monitoring device, wherein the second alarm information comprises one of the group consisting of (a) maliciousness of the suspicious code, and (b) both the maliciousness of the suspicious code and Botnet topology information.

3. The method according to claim 2, further comprising:
   intercepting, by the network device, suspicious codes that are malicious according to the maliciousness of the suspicious code if the second alarm information comprises the maliciousness of the suspicious code; and
   intercepting, by the network device, suspicious codes that are malicious and packets in a Botnet corresponding to the Botnet topology information according to the maliciousness of the suspicious code and the Botnet topology information if the second alarm information comprises the maliciousness of the suspicious code and the Botnet topology information.

4. A network device, comprising:
   a computing hardware; and
   a non-transitory computer-readable medium including computer-executable instructions facilitating, performing a method for alerting against unknown malicious codes, the method comprising:
      determining, by the network device from characteristics of a packet of a data stream comprising a plurality of packets, a suspicious code exists in the data stream when:
         data carried in a packet of the plurality of packets comprises a 'get *' data string, wherein '*' comprises a string of random length including a name for a file,
         data carried in another packet of the plurality of packets comprises a characteristic code of a portable executable (PE) file header, and
         a file type of the file corresponding to the 'get *' data string differs from a file type of a PE file associated with the PE file header;
      recording, by the network device, a source address of the suspicious code when the network device determines, during the determining, that the suspicious code exists in the packet, wherein the source address appears in a URL after 'get' in the 'get *' data string, and is used for downloading the suspicious code by a monitoring device; and
      sending, by the network device, first alert information that carries the source address to the monitoring device, and where the source address is thereafter used by the monitoring device to perform malicious code detection.

5. The network device according to claim 4, further comprising:
   a first receiving module, configured to receive alarm information sent by the monitoring device, wherein the alarm information comprises one of the group consisting of (a) maliciousness of the suspicious code, and (b) both the maliciousness of the suspicious code and Botnet topology information.

6. The network device according to claim 5, further comprising one of the group consisting of:
   a first intercepting module, configured to intercept suspicious codes that are malicious according to maliciousness of the suspicious codes; and
   a second intercepting module, configured to intercept the suspicious codes that are malicious and packets in a Botnet corresponding to Botnet topology information according to the maliciousness of the suspicious codes and the Botnet topology information.

7. A system for alerting against unknown malicious codes, comprising:
   a monitoring device; and
   a network device; comprising:
      a computing hardware; and
      a non-transitory computer-readable medium including computer-executable instructions facilitating, performing a method for alerting against unknown malicious codes, the method comprising:
         determining, by the network device from characteristics of a packet of a data stream comprising a plurality of packets, a suspicious code exists in the data stream when:
            data carried in a packet of the plurality of packets comprises a 'get *' data string, wherein comprises a string of random length including a name for a file,
            data carried in another packet of the plurality of packets comprises a characteristic code of a portable executable (PE) file header, and
            a file type of the file corresponding to the 'get *' data string differs from a file type of a PE file associated with the PE file header;
         recording, by the network device, a source address of the suspicious code when the network device determines, during the determining, that the suspicious code exists in the packet, wherein the source address appears in a URL after 'get' in the 'get *' data string, and is used for downloading the suspicious code by a monitoring device; and sending, by the network device, first alert information that carries the source address to the monitoring device, and where the source address is thereafter used by the monitoring device to perform malicious code detection; and wherein the monitoring device, comprises:
  a computing hardware; and
  a non-transitory computer-readable medium including computer-executable instructions for carrying out a method comprising:
    receiving the first alert information;
    resolving the first alert information to obtain the source address;
    downloading the suspicious code corresponding to the source address;
    judging whether the suspicious code is malicious; and
    sending second alarm information if determining the suspicious code as malicious.

* * * * *

UNITED STATES PATENT AND TRADEMARK OFFICE
CERTIFICATE OF CORRECTION

PATENT NO. : 9,674,206 B2  
APPLICATION NO. : 13/481273  
DATED : June 6, 2017  
INVENTOR(S) : Wu Jiang Page 1 of 1

It is certified that error appears in the above-identified patent and that said Letters Patent is hereby corrected as shown below:

On the Title Page

Item (73), "Chengdu Huawei Symantec Technologies Co., Ltd., Chengdu, CHINA" should read -- Huawei Digital Technologies (Cheng Du) Co. Limited, Chengdu, CHINA --.

In the Specification

Column 8, Line 57-58, "wherein comprises" should read -- wherein '*' comprises --.

Signed and Sealed this  
Twenty-fourth Day of July, 2018

Andrei Iancu  
*Director of the United States Patent and Trademark Office*